(12) United States Patent
Mullins et al.

(10) Patent No.: US 6,537,337 B2
(45) Date of Patent: Mar. 25, 2003

(54) AIR FILTER FOR EXTRACTION APPARATUS

(75) Inventors: Philip Arthur Mullins, Purex House, Farfield Park, Manvers, Rotherham (GB), S63 5DB; John Horsey, Sheffield (GB)

(73) Assignees: Philip Arthur Mullins, Rotherham (GB); Barbara Mullins, Rotherham (GB); Robert Turner, Rotherham (GB)

( * ) Notice: Subject to any disclaimer, the term of this patent is extended or adjusted under 35 U.S.C. 154(b) by 0 days.

(21) Appl. No.: 09/865,298

(22) Filed: May 25, 2001

(65) Prior Publication Data

US 2002/0162308 A1 Nov. 7, 2002

(30) Foreign Application Priority Data

May 4, 2001 (GB) .............................................. 0110987

(51) Int. Cl.⁷ .............................................. B01D 46/02
(52) U.S. Cl. .............................. 55/361; 55/381; 55/482; 55/485; 55/524; 210/490; 210/496
(58) Field of Search .................. 55/361, 381, 356, 55/369, 482, 485, 486, 524; 210/490, 496, 506

(56) References Cited

U.S. PATENT DOCUMENTS

| | | | |
|---|---|---|---|
| 2,071,982 A | * | 2/1937 | Martinet ...................... 55/374 |
| 2,076,304 A | * | 4/1937 | Strindberg .................. 55/379 |
| 2,543,556 A | | 2/1951 | Senne |
| 3,070,233 A | | 12/1962 | Welch |
| 3,387,433 A | * | 6/1968 | Mackey ....................... 55/356 |
| 3,491,522 A | | 1/1970 | Fesco |
| 4,022,695 A | * | 5/1977 | Howard et al. .............. 210/486 |
| 4,589,894 A | | 5/1986 | Gin et al. |
| 5,069,691 A | * | 4/1993 | Travis et al. .................. 55/356 |
| 5,230,723 A | * | 7/1993 | Travis et al. .................. 55/381 |
| 5,414,915 A | * | 5/1995 | Pryne ........................... 55/356 |
| 5,433,763 A | * | 7/1995 | Shagott et al. ............... 55/356 |
| 5,588,985 A | * | 12/1996 | Shagott et al. ............... 55/356 |
| 5,593,470 A | * | 1/1997 | Shagott et al. ............... 55/356 |
| 6,171,369 B1 | | 1/2001 | Schultink et al. |
| 6,375,014 B1 | * | 4/2002 | Garcera et al. .............. 55/524 |

FOREIGN PATENT DOCUMENTS

| | | |
|---|---|---|
| DE | 2139671 | 2/1973 |
| DE | 2901876 | 7/1980 |
| FR | 559695 | 9/1923 |
| FR | 642371 | 8/1928 |
| FR | 847464 | 10/1939 |
| GB | 1436905 | 5/1976 |

* cited by examiner

Primary Examiner—David A. Simmons
Assistant Examiner—Minh-Chau T. Pham
(74) Attorney, Agent, or Firm—Richard M. Goldberg (57) ABSTRACT

A filter for air extraction apparatus is disclosed, which is assembled from a porous material arranged to collect contaminants. The filter comprises a bag with a constricted inlet for receiving contaminated air. The bag is formed from a plurality of envelopes having filtering side walls and each of the envelopes has at least one orifice connected to an orifice of an adjacent envelope.

25 Claims, 9 Drawing Sheets

AIR FILTER FOR EXTRACTION APPARATUS

BACKGROUND OF THE INVENTION

1. Field of the Invention

The present invention relates to a filter for air extraction apparatus, air extraction apparatus and a method of manufacturing a filter for air extraction apparatus.

2. Description of the Related Art

Extraction systems for extracting and filtering air to remove air-entrained particulate matter and gases are known. Apparatus of this type is used in a wide variety of industrial situations such as, for example, in the electronics industry and in the pharmaceutical industry. Workstations on an assembly at which fume and/or dust generating operations are carried such as for example, the fabrication of electronic circuit boards, requires an extraction system. Fume extraction assemblies manufactured and sold by the present applicant under the trademark "Purex" include a number of articulating arm assemblies for different workstations, linked together by appropriate pipework to a pump and filter assembly.

Many filtering assemblies are known and it is also well recognised that a filter must be appropriate for the type of material that is being filtered from the air stream, the filter must provide the requisite degree of filtering and furthermore the filter must provide an operational period of sufficient length. Problems arise with many filtering systems of this type in that in order to provide an appropriate degree of filtering, it is possible that the life of the filter will be reduced. Similarly, if attempts are made to increase the operational lifetime of the filter it is likely that, at some stage, this will reduce the filtering efficiency.

BRIEF SUMMARY OF THE INVENTION

According to a first aspect of the present invention there is provided a filter for air extraction apparatus assembled from a porous material arranged to collect contaminants, comprising a bag with a constricted inlet for receiving contaminated air, wherein said bag is formed from a plurality of envelopes having filtering side walls and each said envelope has at least one orifice connected to an orifice of an adjacent envelope.

Thus, since the filter comprises a plurality of connected envelopes, it provides an increased surface filtering area when compared to filter-bags having a single compartment.

According to a second aspect of the present invention there is provided an air extraction apparatus including a filter comprising a bag with a constricted inlet for receiving contaminated air, wherein said bag is formed from a plurality of envelopes, each of said envelopes has filtering side walls, and each of said envelopes has at least one orifice connected to an orifice of an adjacent envelope.

According to a third aspect of the present invention there is provided a method of manufacturing a filter for air extraction apparatus comprising a bag with a restricted inlet for receiving contaminated air, wherein said method comprises the steps of: providing a plurality of sheets of a porous material arranged to collect contaminants; defining an orifice in selected ones of said sheets; connecting said sheets to form a plurality of envelopes having filtering side walls such that each said envelope has at least one orifice connected to an orifice of an adjacent envelope.

BEST MODE FOR CARRYING OUT THE INVENTION

FIG. 1

Figure 1:
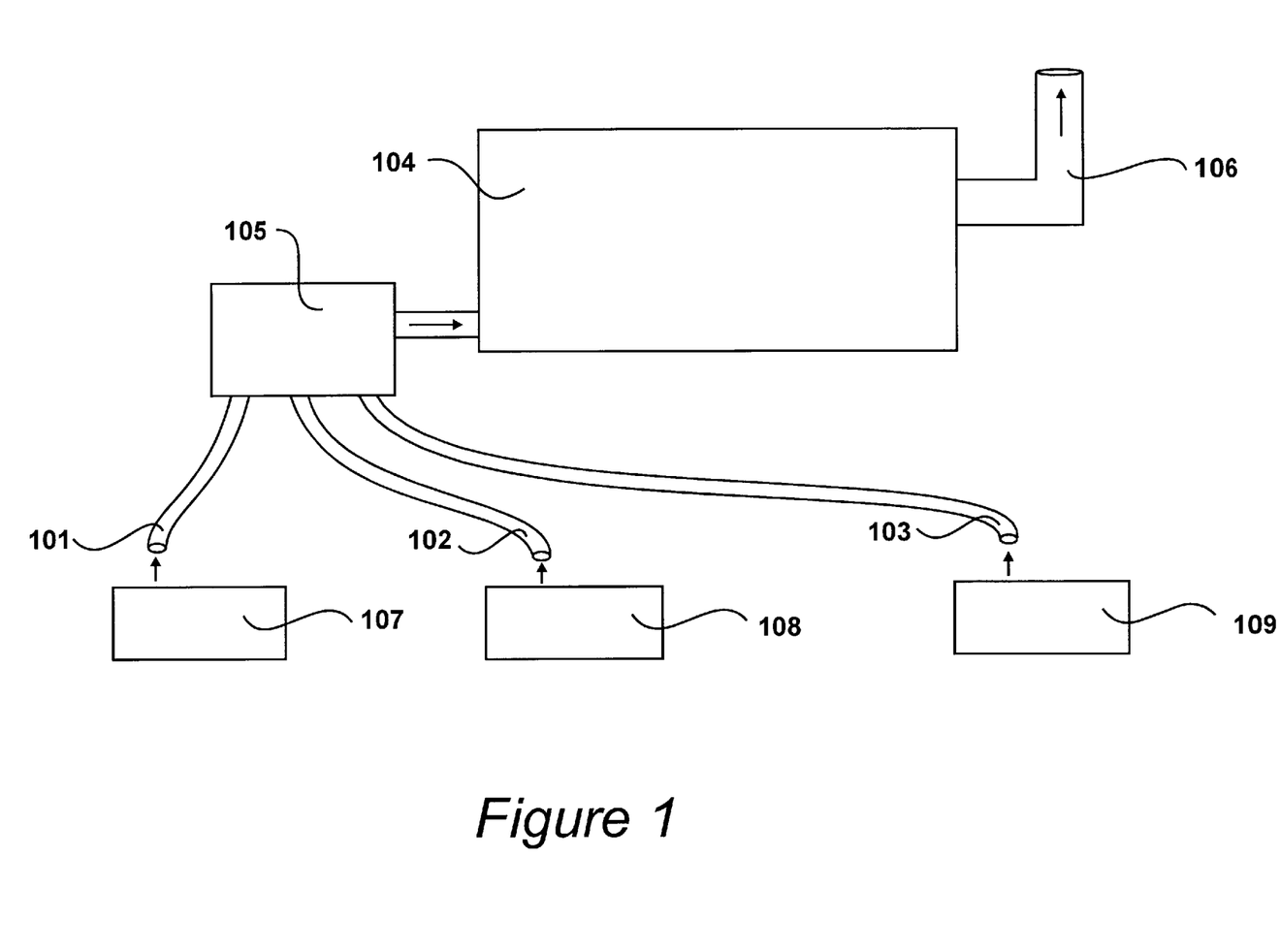
FIG. 1 shows an air purification system in which purification arms 101, 102, 103 are connected to a centralised purification system 104 via a conduit 105.

An air purification system is illustrated in FIG. 1 in which purification arms 101, 102, 103 are connected to a centralised purification system 104 via a conduit 105. The conduit 105 allows up to fifty purification arms to be connected. Alternatively, filter life can be enhanced by installing a multiple of cellular systems or, with fewer systems connected, higher velocity of purification may be performed.

The purification system 104 provides sufficient purification for filtered air to be vented to atmosphere via an exhaust vent 106. Purification arms 101, 102 and 103 can be arranged to remove and purify hazardous fumes and dust from many processors 107,108 and 109 that create contaminants of this type, including chemical and biological treatments, manual and automated soldering, etching, marking and cutting metals and plastics, welding, laser processes and powder handling and packaging etc.

FIG. 2

Figure 2:
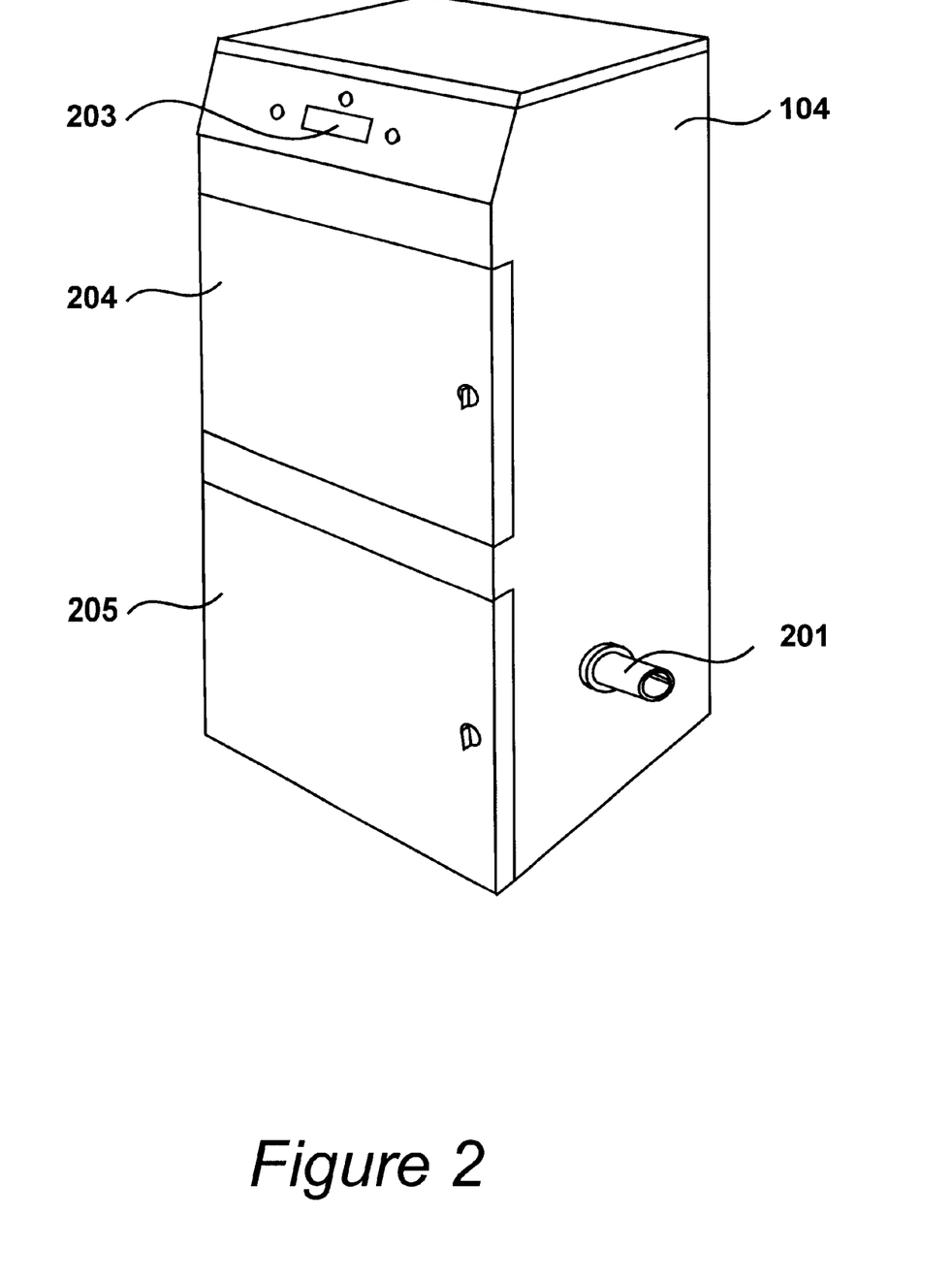
FIG. 2 shows the purification system 104.

Purification system 104 is shown in FIG. 2 and comprises, in its base configuration, a stainless steel cabinet of a size substantially similar to that of the domestic fridge freezer. Contaminated air is received at an air inlet 201 and purified air is supplied to an air outlet (shown in FIG. 3). An LCD display 203 indicates operating conditions, such as filterable filter capacity, gas sensing, particle sensing, days to next service and temperature warning indicator. The front panel also includes control buttons, including on and off switches.

An upper door 204 provides access to a main filter, while a lower door 205 provides access to a pre-filter, for the purposes of filter replacement.

FIG. 3

Figure 3:
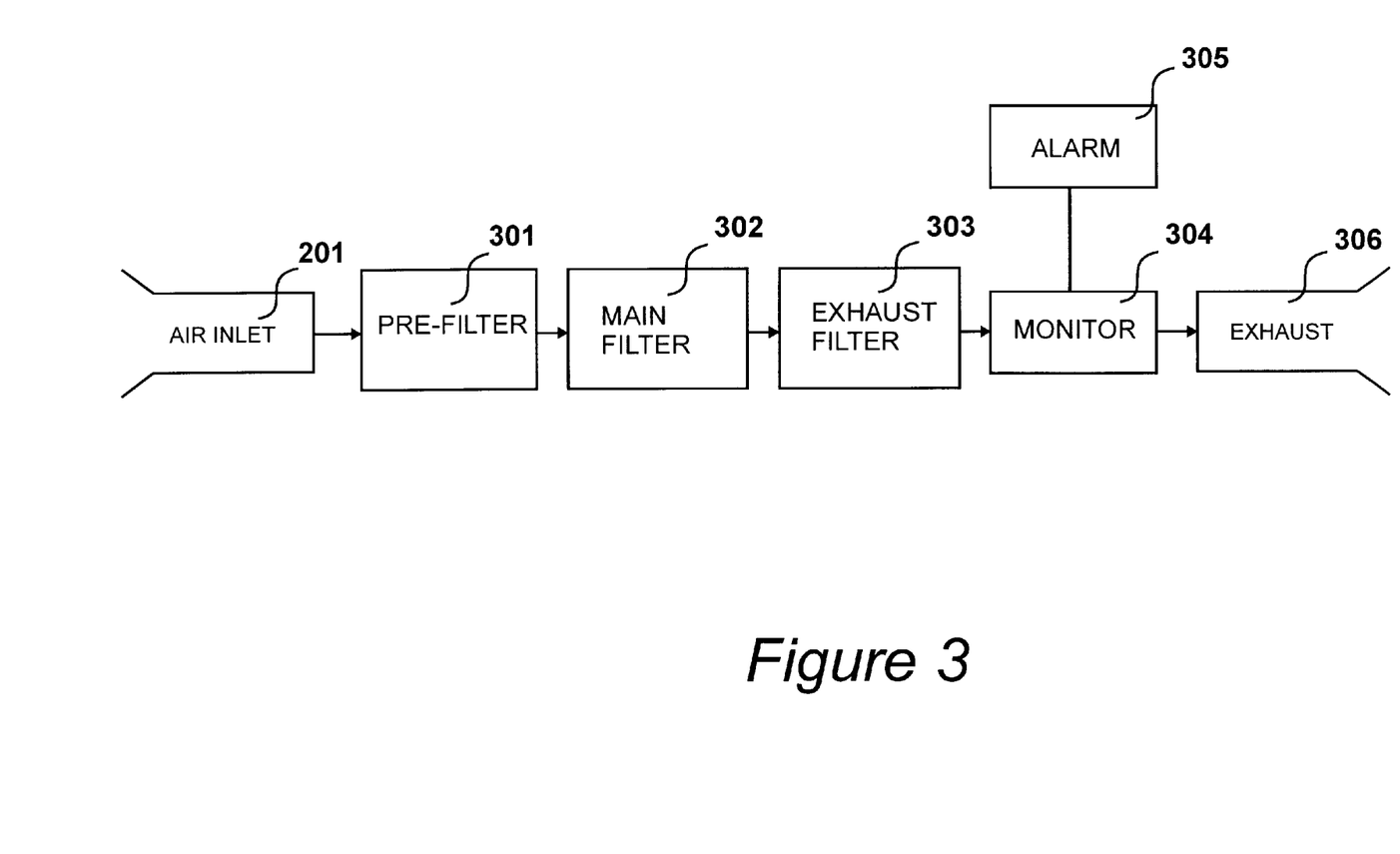
FIG. 3 shows a schematic representation of operations performed within the purification system 104.

A schematic representation of operations performed within the purification system 104 is shown in FIG. 3. Air inlet 201 supplies contaminated air to a pre-filter 301, that in turn supplies partially filtered air to a main filter 302 that in turn supplies relatively well filtered air to an exhaust filter 303. The output from the exhaust filter 303 is then supplied to the exhaust outlet 306 via a continuous exhaust air monitoring unit 304 that sounds an audible alarm 305 if air quality drops between a predetermined level. The combination of the pre-filter 301, main filter 302 and exhaust filter 303 facilitates careful matching to provide an optimum combination for the particular type of hazardous fumes and dust that are being removed from a contaminated air stream.

FIG. 4

Figure 4:
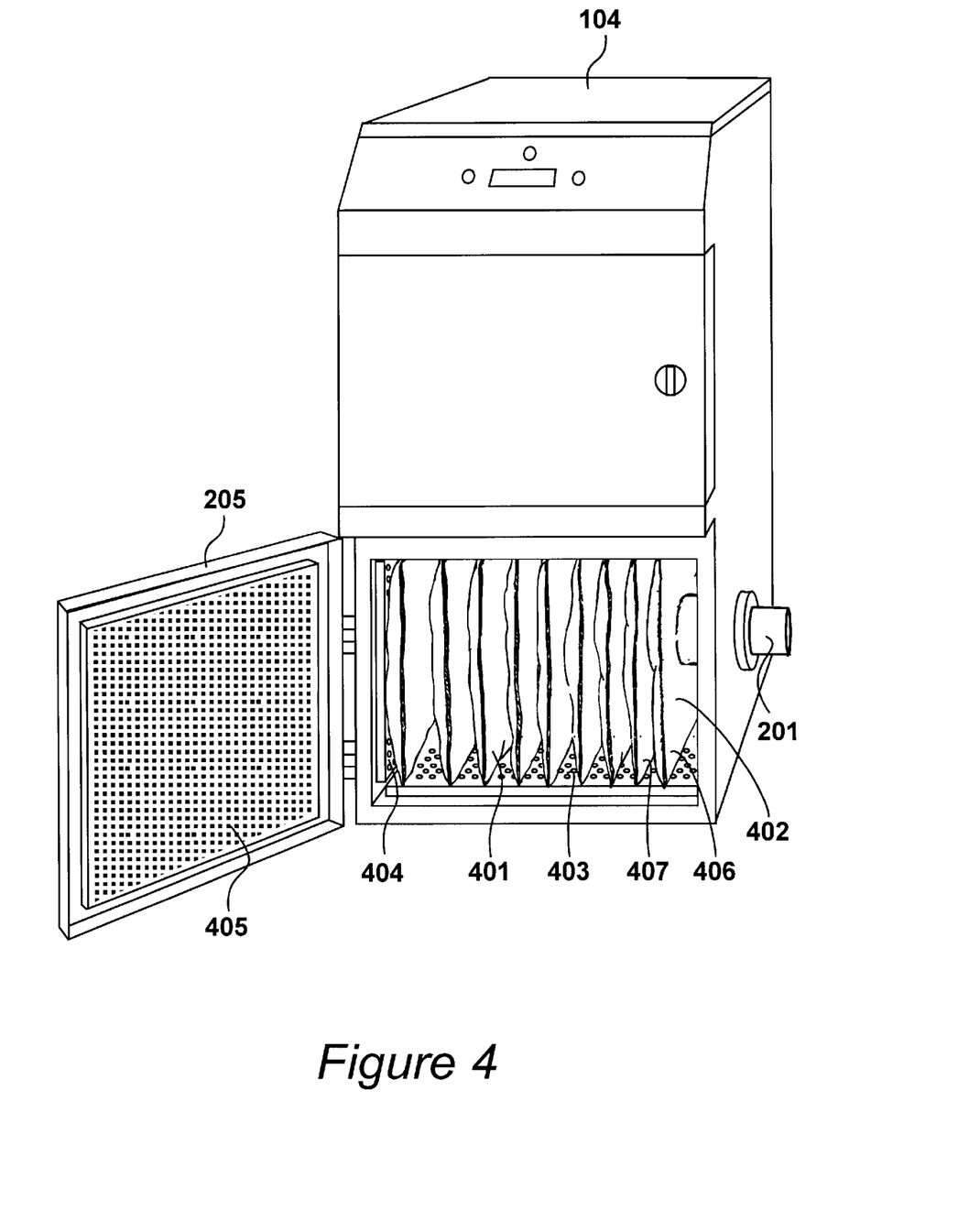
FIG. 4 shows the purification system 104 with the lower door 205 open, allowing the pre-filter 401 to be accessed.

The purification system 104 is shown in FIG. 4 with the lower door 205 open allowing the pre-filter 401 to be accessed. The pre-filter 401 is located in a chamber 402 having an outlet (not shown) through which air is drawn from the chamber during operation. The air drawn from the chamber is subsequently drawn through the main filter 302. Each of the six walls of chamber 402 has a perforated stainless steel panel fixed parallel to it, thereby defining six corresponding passageways through which air may flow. Thus, for example, the floor of the chamber has a perforated panel 403, the left side wall has a perforated panel 404 and the inside of the door 205 has a perforated panel 405. (The rear wall, right wall and ceiling each have a similar panel attached.) In the present embodiment the perforated panels are stainless steel sheets having an array of apertures. However, in an alternative embodiment the perforated panels are fabricated from a mesh material.

In operation, air is drawn from all sides of the pre-filter 401 through the perforations in the perforated panels, through the passageways defined by the perforated panels and out though the outlet. Thus, the perforated panels provide a support structure which maintains the location of the pre-filter while allowing air to be drawn from all around it.

The air inlet 201 comprises a pipe section fixed rigidly in the side wall of the chamber 402, such that it allows air to enter the chamber.

The pre-filter 401 comprises a bag formed from a porous material arranged to collect airborne contaminants. The pre-filter has a constricted inlet comprising a pipe (detailed later in FIGS. 8 and 9) which is configured to be a good push fit within inlet pipe section 201. Therefore, during operation of the purification system 104, contaminated air enters the pre-filter from the air inlet 201, and some of the larger particulate matter is collected by the filter while the pre-filtered air passes through the porous walls of the pre-filter and eventually escapes through the chamber's outlet.

During use, as the pre-filter fills with particulate matter, its porosity gradually reduces, and eventually the pre-filter must be replaced. To remove the used filter 401, the pipe which forms its inlet is pulled and twisted from the inlet pipe 201, and then the pre-filter is withdrawn from the chamber 402 and disposed of. A new pre-filter is then located in its operating position by the reverse procedure. Since the pre-filter is bag-like and has a restricted inlet, an operator replacing the filter is not exposed to its inner contaminated surface, and the contaminants contained within the used pre-filter are substantially maintained within it during the replacement process. Thus risks of contaminating the operator replacing the filter are reduced compared to other known filters which have an open configuration, such that the contaminated side of the filtering material is exposed to the operator.

When the purification system 104 is used to purify air extracted from some processes such as metal welding, the particles tend to enter the pre-filter 401 and fall towards the bottom of the bag, thus leaving the pores within the upper regions of the walls relatively free from contamination. However, when the system 104 is used to purify air extracted from certain other processes such as laser cutting or welding of plastics, or soldering of electronic circuitry by a wave soldering process or in a re-flow oven process, the contaminant entrapped by the pre-filter tends to stick to all of its inner surfaces. Therefore, in such circumstances, the useful life of the pre-filter is proportional to its filtering surface area. The pre-filter 401 has a long useful life when compared to known bag-like pre-filters of comparable volume, since filter 401 has been configured to have a relatively large filtering surface area.

Whereas known filter bags comprise substantially of one cube or cuboid compartment, the filter of the present application has a plurality of interconnected compartments defined by a series of envelopes such as envelopes 406 and 407. Therefore, it is this structure of connected envelopes which provides the filter 401 with its large filtering area and subsequent long life.

FIG. 5

Figure 5:
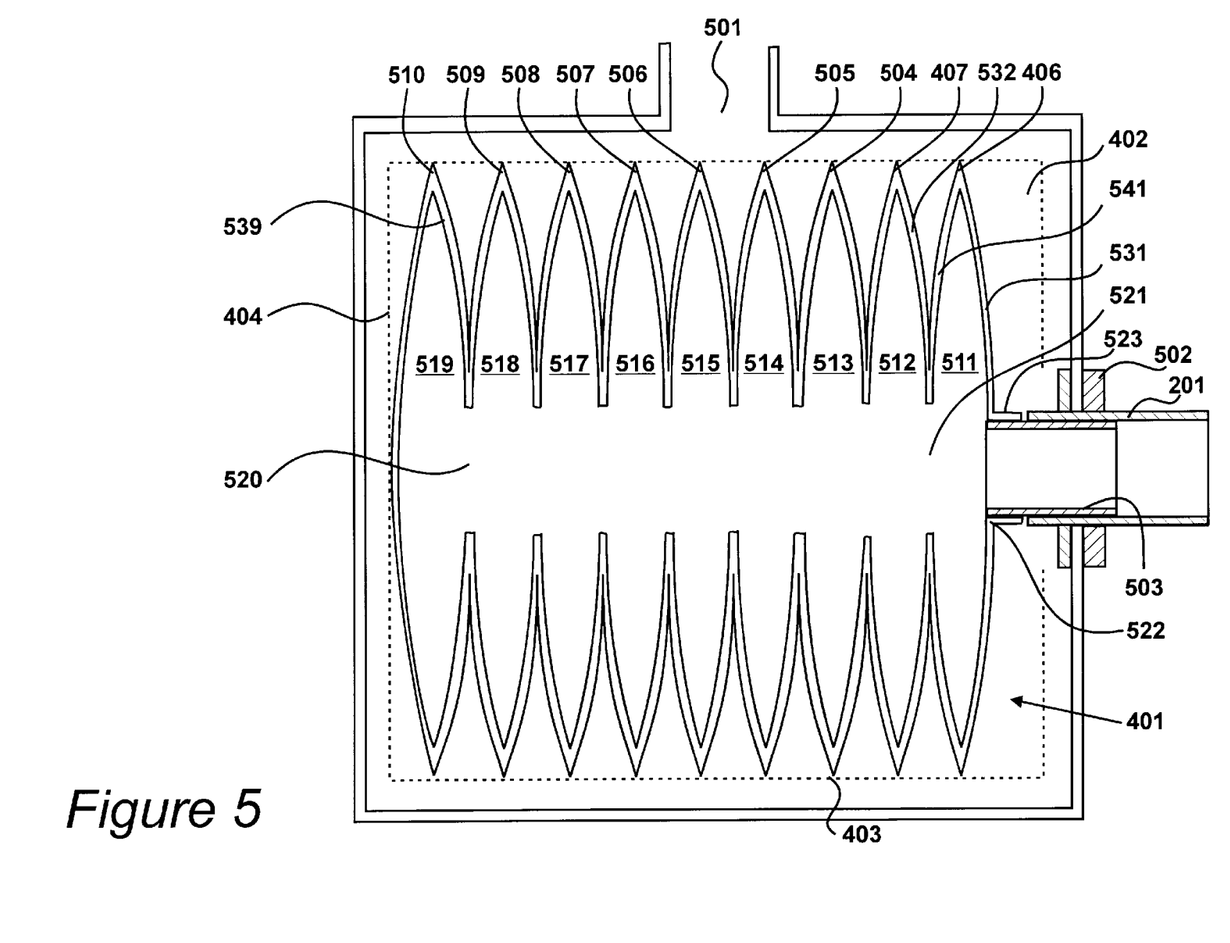
FIG. 5 shows a schematic cross-sectional diagram of the pre-filter 401 located within the chamber 402.

A schematic cross-sectional diagram of the pre-filter 401 located within the chamber 402 is shown in FIG. 5. As described above, the pre-filter 401 is supported by panels such as panels 403 and 404, that are perforated to allow air to be drawn out from all around the pre-filter and out through chamber outlet 501.

The air inlet pipe 201 of the purification system is fixed to the wall of the chamber by a screw threaded mechanism 502. The pre-filter 401 includes an inlet pipe 503 which is a good push fit in pipe 201. The filter 401 comprises a bag having a total of nine envelopes 406, 407, 504, 505, 506, 507, 508, 509 and 510 which each define one of the nine compartments 511 to 519 within the bag. Each of the envelopes 407 and 504 to 509 has an orifice within each of its two side walls of filtering material, to provide connection between its compartment and adjacent compartments on either side. Envelope 510 has an orifice 520 in just one of its sides walls, 539, to allow communication between its compartment 519 and the compartment 518 of its only neighbouring envelope 509. Envelope 406 has an orifice in each of its two side walls, 531 and 541: the first orifice 521 being connected to the orifice of its adjacent envelope 407, and the second orifice 522 being connected to a tube 523 of filtering material which is itself bonded to the inlet pipe 503.

Thus the pre-filter has a series of connecting compartments, connected such that during use air entering the inlet pipe 503 of the pre-filter enters the first compartment 511 and a portion of that air passes through each of the compartments in the series before passing into the end compartment 519 and out through its side walls.

It should be understood, that during use air passes through each of the filtering side walls of each of the envelopes. In this example of nine envelopes, the filter 401 has a total of 18 side walls, each of which has an area almost as large as the side walls of the chamber itself. The filtering surface of the filter 401 is therefore much larger than a cuboid shaped filter bag as previously known.

When considering the number of envelopes which should be included in the construction of a filter bag, such as pre-filter 401, up to a limit, its filtering surface area is approximately proportional to the number of envelopes. However, the dimensions of the support structure which maintains the location of the filter should be considered. During use each envelope's side walls tend to balloon out towards a side wall of an adjacent envelope. For example, side wall 541 of envelope 406 tends to be brought closer to side wall 532 of envelope 407. If too many envelopes are included in the construction of a filter, for use in a particular support structure, the side walls come into contact over a proportion of their area and that proportion is lost for filtering purposes. Therefore, it is preferable that the number of envelopes be such that during use the envelope side walls do not press against one another. i.e. the filtering side walls are only in contact with adjacent side walls in the vicinity of the connection between them. In this manner, substantially all of the surface area of each envelope is used for filtering.

In the present example, the pre-filter 401 is located in a support structure having an internal height of 360 mm, a depth (from front to back) of 360 mm and a width 360 mm. Consequently, the pre-filter has envelopes having a length of 360 mm and width 360 mm to fit the support structure and it has nine envelopes, since this is the most envelopes which can fit across the width of the support structure without losing significant filtering surface due to the above described contacting of side walls. Thus pre-filter 401 has a number of envelopes which maximises the filtering area, given the dimensions of the support structure.

It should also be noted that the optimum number of envelopes also depends on the material from which the filter is constructed. In the present embodiment, the material used is relatively thick, but in an alternative embodiment, the pre-filter material is a filtering paper and consequently the optimum number of envelopes is increased.

The orifices connecting compartments of the filter 401 are located centrally in their respective side walls, and thus the orifices of all the envelopes fall along a straight horizontal line when the filter is located in the chamber 402. However, in an alternative embodiment the orifices are all arranged equally off centre. In a further embodiment, the orifices are arranged such that air enters an envelope towards its upper end and exits towards its lower end, or enters at its lower end and exits towards its upper end.

FIG. 6

Figure 6:
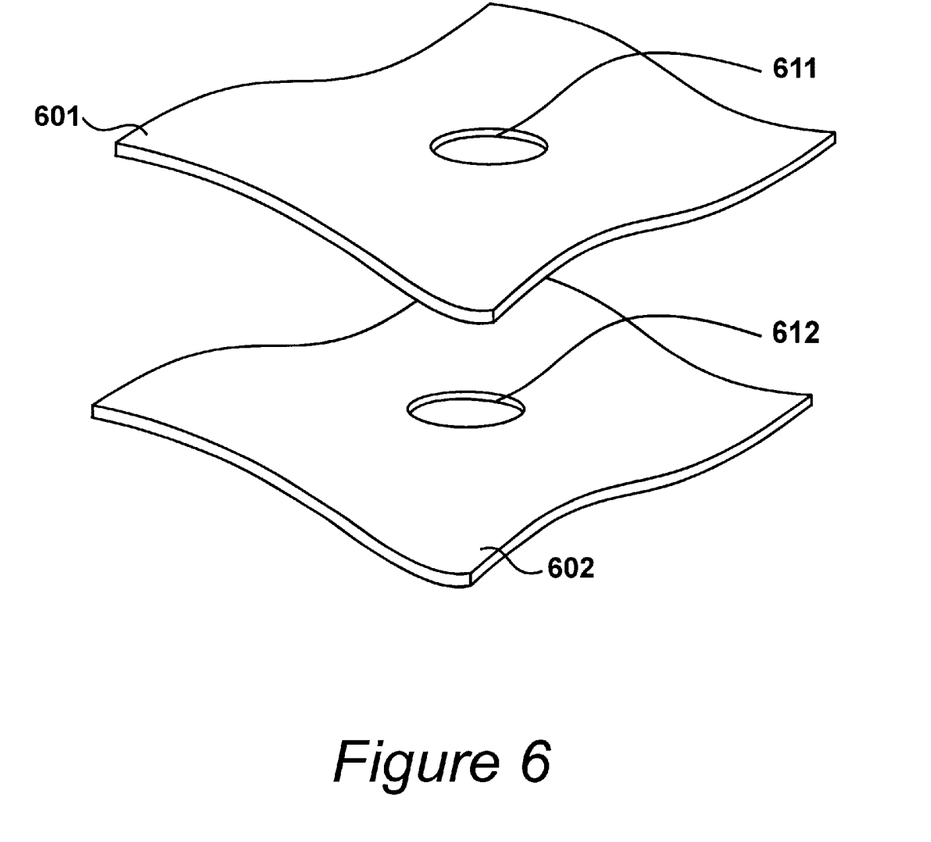
FIG. 6 illustrates the first steps in manufacturing the pre-filter 401.

The first steps in manufacturing the pre-filter 401 are illustrated in FIG. 6. A sheet of material 601 is cut to a rectangular shape, (which in the present example is a 36 centimeter square), and a 7 centimeter circular orifice 611 is cut from its centre. A second sheet of material 602 having a orifice 612 is then cut to replicate sheet 601. Each of the sheets 601 and 602 is a made from 20 mm thick, EU grade 5 filter material. The filter material is non-woven polyester material, and it has a graded structure. That is, it presents a more open structure for use on the inside of the filter than on the outside. Therefore, during use, particles of varying sizes are entrapped at various levels throughout the thickness of the material, with larger particles being caught, on average, earlier than smaller particles. Thus the graded structure in effect provides for a larger filter capacity.

FIG. 7

Figure 7:
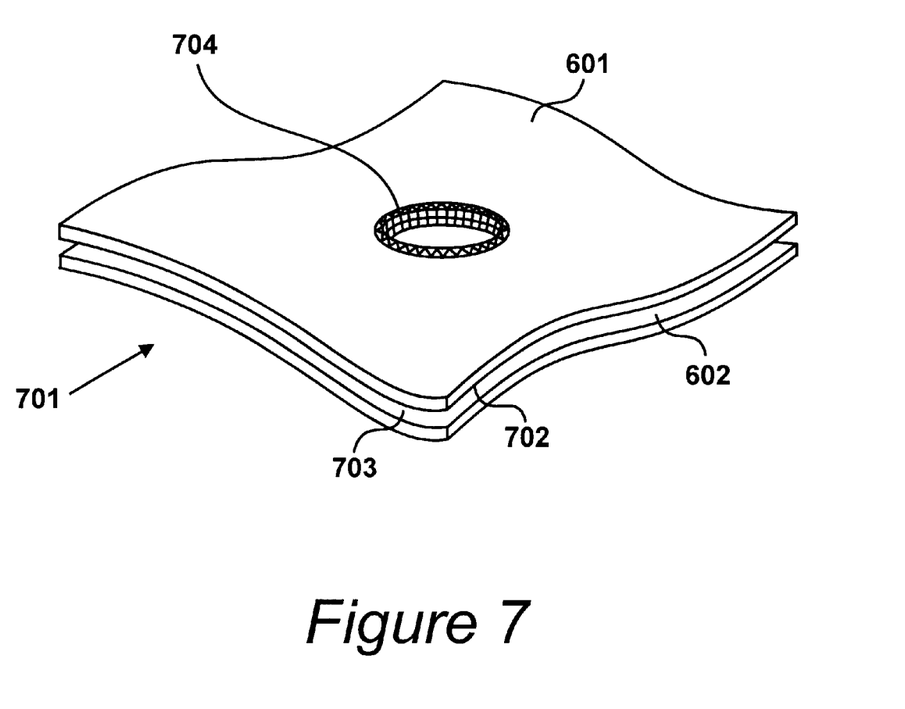
FIG. 7 shows the sheets 601 and 602 of FIG. 6 sewn together.

The sheets 601 and 602 of FIG. 6 are shown sewn together in FIG. 7. Having cut out the two sheets 601 and 602, the two sheets are sewn together by stitching 704 around the perimeter of their orifices, such that the two rectangular shapes are aligned, to form sub-assembly 701. The contacting inner surfaces 702 and 703 of sub-assembly 701 represent a portion of the outer surface of the complete filter 401.

FIG. 8

Figure 8:
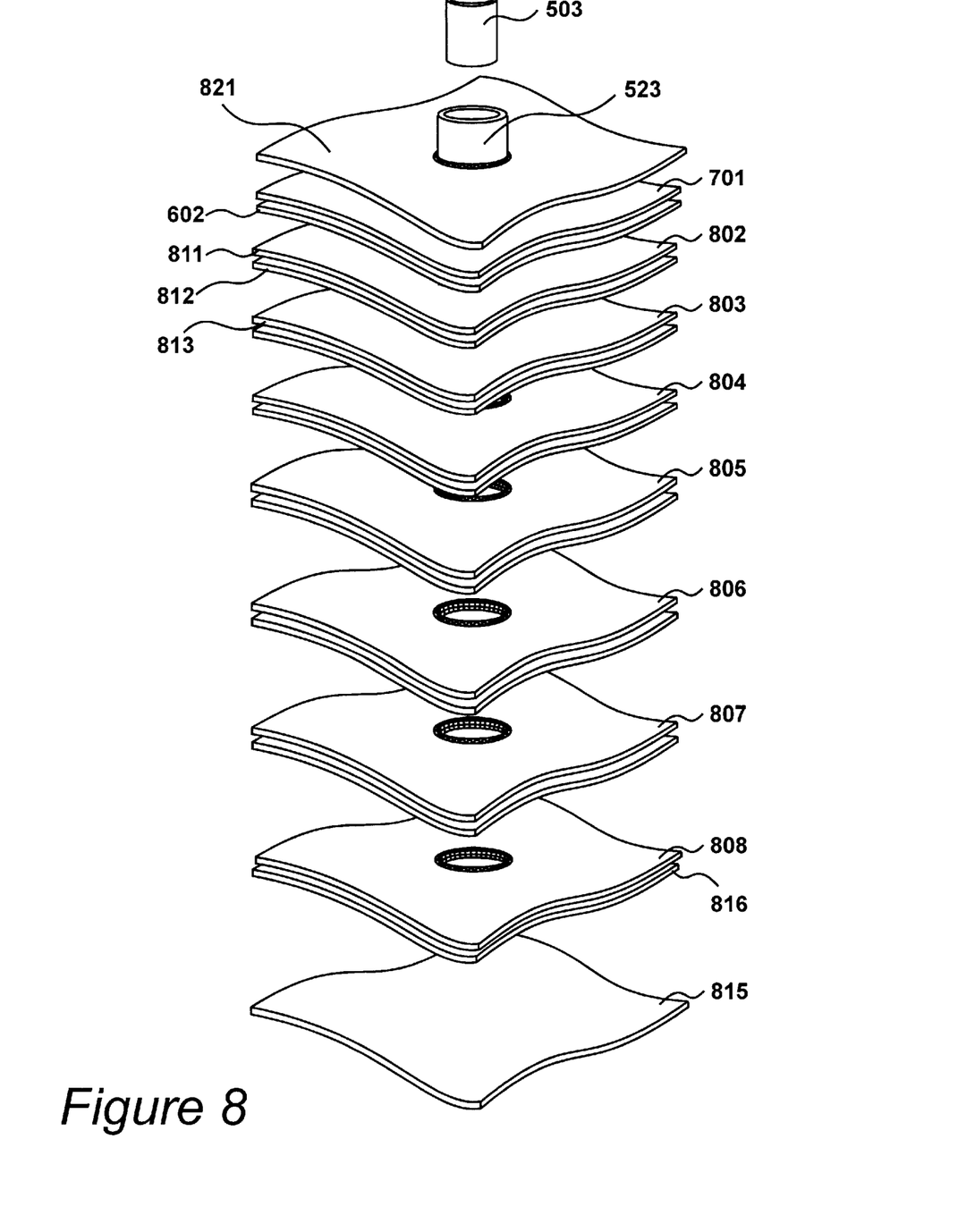
FIG. 8 illustrates the final steps in manufacturing the pre-filter 401.

The final steps in manufacturing the pre-filter 401 are illustrated in FIG. 8. Sub-assembly 701 is replicated to produce sub-assemblies 802, 803, 804, 805, 806, 807 and 808. Sub-assembly 701 is then attached to sub-assembly 802 by sewing together the outer perimeter of sheet 602 and outer perimeter of a sheet 811 of subassembly 802. Thus a first envelope 407 of the filter is formed. In a similar manner, the other sheet 812 of subassembly 802 is then sewn to a sheet 813 of subassembly 803 to form a second envelope 504. Thus in this manner the sub-assemblies are sewn together to form a chain. Therefore, in a similar manner sub-assembly 804 is sewn to subassembly 803 before the remaining subassemblies 805 to 808 are sewn onto the chain.

A rectangle of filter material 815 having the same dimensions as sheets 601 and 602 is then attached to the last sheet 816 of subassembly 808 in the chain. Again the attachment is made by sewing together the perimeters of sheets 815 and 816.

An inlet subassembly is formed by first sewing the opposing edges of a smaller rectangle of filter material together to form the tube 523. A further rectangular sheet 821 of filter material, cut to replicate sheet 601, is then attached to the tube 523 by sewing one end of the tube 523 to the perimeter of the orifice of sheet 821. A piece of pipe 503, made from PVC (polyvinyl chloride) is then bonded into the tube 523 using a solvent cement sold by Polypipe Plc, England. A portion of the pipe 503 is left exposed, since it is this which is subsequently used to connect the complete pre-filter to the air inlet 201 of the purification unit. Alternatively, an ABS (acrylonitrile-butadiene-styrene) pipe may be used in place of the PVC pipe.

The inlet subassembly is then attached to the sheet 601 of subassembly 701 by sewing around the outer perimeters of sheets 601 and 821, and thus the pre-filter is completed.

In an alternative embodiment the filter material is an EU grade 5 filter paper and the individual sheets are connected using a suitable paper adhesive, such as silicone adhesive, or a hot melt adhesive, instead of by sewing.

FIG. 9

Figure 9:
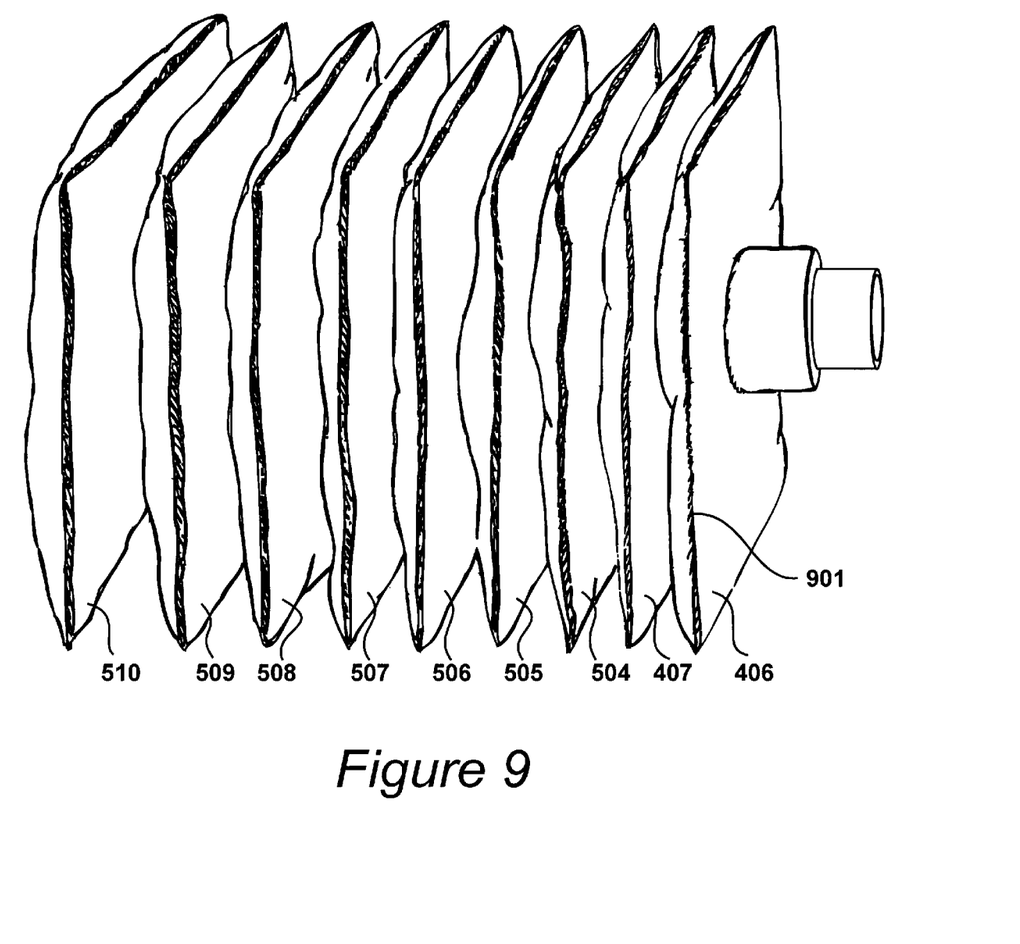
FIG. 9 shows the complete pre-filter 401.

The complete pre-filter 401 is shown in FIG. 9. As shown in FIG. 9 stitching 901 connects and seals the outer perimeters of alternate sheets to form the series of envelopes 406, 407 and 504 to 510. Thus the first sheet is connected to the second, the third sheet is connected to the fourth, etc. Similarly, stitching around the perimeters of the orifices of the sheets connects the orifices of adjacent envelopes.

What we claim is:

1. Air extraction apparatus comprising:
   a support structure for supporting a filter during filtering; and
   a filter configured to be located within said support structure, said filter being assembled from a porous material arranged to collect contaminants, and comprising a bag with a constricted inlet for receiving contaminated air, said bag being formed from a plurality of envelopes having filtering side walls and each of said envelopes having at least one orifice cut from a filtering side wall and connected to an orifice of an adjacent envelope, the side walls of said envelopes being arranged for contact nwith side walls of adjacent envelopes;
   wherein said support structure and said filter are configured such that during filtering an area of contact between adjacent envelopes is dependent upon the number of envelopes included in the filter.

2. Air extraction apparatus according to claim 1, wherein each said envelope comprises a first sheet of filtering material and a second sheet of filtering material, and wherein an outer perimeter of said first sheet is connected to an outer perimeter of said second sheet.

3. Air extraction apparatus according to claim 2, wherein said sheets of filtering material are connected by stitching.

4. Air extraction apparatus according to claim 1, wherein each said envelope defines a compartment such that said connected orifices provide connection between said compartments, and said filter is configured such that in use a portion of air drawn into said inlet passes through all of said compartments.

5. Air extraction apparatus according to claim 1, wherein said filter is configured as a pre-filter and said apparatus includes a further filter configured to filter air received from said pre-filter.

6. Air extraction apparatus according to claim 1, wherein each filter is located in a support structure comprising perforated panels.

7. Air extraction apparatus according to claim 6, wherein said apparatus includes a chamber and said perforated panels are fixed to side walls of said chamber.

8. Air extraction apparatus according to claim 1, wherein said apparatus is arranged to filter air extracted from electronic circuitry soldering apparatus.

9. An air extraction apparatus according to claim 1, wherein said apparatus is arranged to filter air which is contaminated with particles of plastics material.

10. Air extraction apparatus according to claim 1, wherein the number of-envelopes included in said filter and dimensions of the support structure are such that during filtering the side walls of the envelopes contact with adjacent filtering side walls only in the vicinity of said orifices.

11. Air extraction apparatus according to claim 10, further comprising walls defining a chamber; and wherein said support structure includes perforated panels attached to said walls, such that each said perforated panel defines a passageway, and in operation, air is drawn from said filter through perforations in the perforated panels and through said passageways.

12. Air extraction apparatus according to claim 10, wherein said number of envelopes is such that a filtering surface area of said filter is maximized.

13. Air extraction apparatus according to claim 1, further comprising walls defining a chamber; and wherein said support structure includes perforated panels attached to said walls, such that each said perforated panel defines a passageway, and in operation, air is drawn from said filter through perforations in the perforated panels and through said passageways.

14. Air extraction apparatus according to claim 1, wherein said support structure is configured such that it does not separate said envelopes from adjacent ones of said envelopes.

15. Air extraction apparatus according to claim 1, wherein each of said envelopes is formed by sewing together the outer perimeter of a first sheet of said porous filtering material and the outer perimeter of a second sheet of said porous filtering material.

16. Air extraction apparatus according to claim 1, wherein said adjacent envelopes are adapted to contact each other over substantially entire surfaces thereof without obstruction from any member.

17. Air extraction apparatus comprising:
   walls defining a chamber;
   a support structure located within said chamber for supporting a filter during filtering; and
   a filter configured to be r placeable within said support structure, said filter being assembled from a porous material arranged to collect contaminants, and comprising a bag with a constricted inlet for receiving contaminated air, said bag being formed from a plurality of envelopes having filtering side walls, and each of said envelopes having at least one orifice connected to an orifice of an adjacent envelope,
   wherein said support structure and said filter are configured such that during filtering the area of contact between adjacent envelopes is dependent upon the number of envelopes included in the filter, and said support structure is formed by perforated panels attached to said walls such that each said perforated panel defines a passageway, and in operation, air is drawn from said filter through perforations in the perforated panels and through said passageways.

18. A method of manufacturing a filter for air extraction apparatus comprising a bag with a restricted inlet for receiving contaminated air, wherein said method comprises the steps of:
   (a) providing a plurality of sheets of a porous material arranged to collect contaminants;
   (b) defining an orifice in selected ones of said sheets;
   (c) connecting pairs of said selected sheets around their orifices to form subassemblies; and
   (d) connecting said subassemblies together to form a plurality of envelopes having filtering side walls such that each of said envelopes has at least one orifice connected to an orifice of an adjacent envelope.

19. A method of manufacturing a filter for air extraction apparatus according to claim 18, wherein each of said envelopes comprises a first sheet of filtering material; and second sheet of filtering material, and wherein the outer perimeter of said first sheet is connected to the outer perimeter of said second sheet.

20. A method of manufacturing a filter for air extraction apparatus according to claim 19, wherein said sheets of filtering material are connected by a sewing process.

21. A filter according to claim 18, wherein said filter is configured to be located within a support means of an air extraction apparatus and said filter is formed from a particular number of envelopes such that during operation an adjacent pair of connected filtering side walls are in mutual contact only in the vicinity of connection.

22. A method of manufacturing a filter for air extraction apparatus according to claim 21, wherein said particular number is such that the filtering surface area of said filter is maximised.

23. A method of manufacturing a filter for air extraction apparatus according to claim 18, wherein said filter is configured such that each of said envelopes defines a compartment such that said connected orifices provide connection between said compartments, and said filter is configured such that in use a portion of air drawn into said inlet passes through all of said compartments.

24. A method of manufacturing a filter for air extraction apparatus according to claim 18, wherein said sheets comprise a material having a graded structure, such that the filter has a more open structure on an inside of the filter than on an outside thereof.

25. A method of manufacturing a filter for air extraction apparatus according to claim 18, wherein the restricted inlet is defined- by a connection arrangement for connecting to an air inlet of said extraction apparatus, and said method includes the steps of:
   connecting one of said selected sheets to said connection arrangement to form an inlet subassembly; and
   connecting said inlet, subassembly to a one of said subassemblies to form an envelope of said filter.

* * * * *